US011985356B2

(12) United States Patent
Ma et al.

(10) Patent No.: US 11,985,356 B2
(45) Date of Patent: May 14, 2024

(54) METHODS AND APPARATUS FOR PREDICTION SIMPLIFICATION IN VIDEO CODING

(71) Applicant: BEIJING DAJIA INTERNET INFORMATION TECHNOLOGY CO., LTD., Beijing (CN)

(72) Inventors: Tsung-Chuan Ma, Beijing (CN); Hong-Jheng Jhu, Beijing (CN); Xianglin Wang, Beijing (CN); Yi-Wen Chen, Beijing (CN); Xiaoyu Xiu, Beijing (CN); Shuiming Ye, Beijing (CN); Yun-fei Zheng, Beijing (CN); Bing Yu, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 202 days.

(21) Appl. No.: 17/558,292

(22) Filed: Dec. 21, 2021

(65) Prior Publication Data
US 2022/0116663 A1 Apr. 14, 2022

Related U.S. Application Data

(63) Continuation of application No. PCT/US2020/038466, filed on Jun. 18, 2020.
(Continued)

(51) Int. Cl.
*H04N 19/70* (2014.01)
*H04N 19/159* (2014.01)
(Continued)

(52) U.S. Cl.
CPC ........... *H04N 19/70* (2014.11); *H04N 19/159* (2014.11); *H04N 19/1883* (2014.11); *H04N 19/46* (2014.11)

(58) Field of Classification Search
CPC .. H04N 19/70; H04N 19/159; H04N 19/1883; H04N 19/46
See application file for complete search history.

(56) References Cited

U.S. PATENT DOCUMENTS

| 2013/0301715 | A1* | 11/2013 | Lin | ..................... | H04N 19/593 |
| | | | | | 375/240.12 |
| 2015/0049813 | A1* | 2/2015 | Tabatabai | ............... | H04N 19/70 |
| | | | | | 375/240.16 |

(Continued)

FOREIGN PATENT DOCUMENTS

WO WO2016137368 A1 9/2016

OTHER PUBLICATIONS

Beijing Dajia Internet Information Technology Co. Ltd. et al., International Search Report and Written Opinion, PCT/US2020/038466, dated Sep. 21, 2020, 8 pgs.

(Continued)

*Primary Examiner* — Rowina J Cattungal
(74) *Attorney, Agent, or Firm* — Osha Bergman Watanabe & Burton LLP

(57) ABSTRACT

A method of decoding a syntax element for a current coding unit of video data is performed by an electronic apparatus. The electronic apparatus identifies, for the current coding unit, an above coding unit and a coding tree unit including the current coding unit. After determining that the above coding unit is within the coding tree unit, the electronic apparatus decodes, from a video bitstream, a corresponding syntax element for the current coding unit based, at least in part, on a syntax element associated with the above coding unit retrieved from a line buffer associated with the coding tree unit; otherwise, the electronic apparatus decodes, from the video bitstream, the corresponding syntax element for the current coding unit based, at least in part, on a default (Continued)

value assigned to the syntax element associated with the above coding unit.

18 Claims, 10 Drawing Sheets

Related U.S. Application Data

(60) Provisional application No. 62/887,533, filed on Aug. 15, 2019, provisional application No. 62/865,180, filed on Jun. 22, 2019.

(51) Int. Cl.
*H04N 19/169* (2014.01)
*H04N 19/46* (2014.01)

(56) References Cited

U.S. PATENT DOCUMENTS

| | | |
|---|---|---|
| 2016/0065964 A1 | 3/2016 | Zhang et al. |
| 2017/0223379 A1 | 8/2017 | Chuang et al. |
| 2018/0213224 A1 | 7/2018 | Son et al. |

OTHER PUBLICATIONS

Benjamin Bross et al., "Versatile Video Coding (Draft 5)," JVET-N1001-v8, Joint Video Experts Team (JVET) of ITU-T SG 16 WP 3 and ISO/IEC JTC 1S/C 29/WG 11, 14th Meeting: Geneva, CH, Jun. 11, 2019, pp. 1-385, pp. 20, 24, 330-331, 400 pgs.
Extended European Search Report issued in corresponding European patent application No. 20831311.4 dated May 17, 2023 (8 pages).

\* cited by examiner

600 identifying, for the current coding unit, an above coding unit and a coding tree unit including the current coding unit 610 determine whether the above coding unit is within the coding tree unit 620 yes → encoding, into a video bitstream, a corresponding syntax element for the current coding unit based, at least in part, on a syntax element associated with the above coding unit retrieved from a line buffer associated with the coding tree unit 630 updating the corresponding syntax element for the current coding unit in accordance with a width comparison of the above coding unit and the current coding unit and the syntax element associated with the above coding unit 630-1 determining a context index of the current coding unit based on the updated corresponding syntax element for the current coding unit 630-3 encoding, into the video bitstream, the corresponding syntax element for the current coding unit in accordance with the context index of the current coding unit 630-5 no → encoding, into the video bitstream, the corresponding syntax element for the current coding unit based, at least in part, on a default value assigned to the syntax element associated with the above coding unit 640 updating the corresponding syntax element for the current coding unit in accordance with a height comparison of a left coding unit of the current coding unit and the current coding unit and the default value assigned to the syntax element associated with the above coding unit 640-1 determining a context index of the current coding unit based on the updated corresponding syntax element for the current coding unit 640-3 encoding, into the video bitstream, the corresponding syntax element for the current coding unit in accordance with the context index of the current coding unit 640-5

FIG. 6A

650 identifying, for the current coding unit, an above coding unit and a coding tree unit including the current coding unit 660 determine whether the above coding unit is within the coding tree unit 670 yes → decoding, from a video bitstream, a corresponding syntax element for the current coding unit based, at least in part, on a syntax element associated with the above coding unit retrieved from a line buffer associated with the coding tree unit 680 updating the corresponding syntax element for the current coding unit in accordance with a width comparison of the above coding unit and the current coding unit and the syntax element associated with the above coding unit 680-1 determining a context index of the current coding unit based on the updated corresponding syntax element for the current coding unit 680-3 decoding, from the video bitstream, the corresponding syntax element for the current coding unit in accordance with the context index of the current coding unit 680-5 no → decoding, from the video bitstream, the corresponding syntax element for the current coding unit based, at least in part, on a default value assigned to the syntax element associated with the above coding unit 690 updating the corresponding syntax element for the current coding unit in accordance with a height comparison of a left coding unit of the current coding unit and the current coding unit and the default value assigned to the syntax element associated with the above coding unit 690-1 determining a context index of the current coding unit based on the updated corresponding syntax element for the current coding unit 690-3 decoding, from the video bitstream, the corresponding syntax element for the current coding unit in accordance with the context index of the current coding unit 690-5

FIG. 6B

METHODS AND APPARATUS FOR PREDICTION SIMPLIFICATION IN VIDEO CODING

CROSS-REFERENCE TO RELATED APPLICATIONS

This application is a continuation of PCT Application PCT/US2020/038466 filed on Jun. 18, 2020, which is based upon and claims priority to U.S. Provisional Application No. 62/865,180 filed on Jun. 22, 2019 and U.S. Provisional Application No. 62/887,533 filed on Aug. 15, 2019, all of which are incorporated herein by reference in their entities for all purposes.

TECHNICAL FIELD

The present application generally relates to video data coding and compression, and in particular, to method and apparatus for prediction simplification in video coding.

BACKGROUND

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression standards as defined by MPEG-4, ITU-T H.263, ITU-T H.264/MPEG-4, Part 10, Advanced Video Coding (AVC), High Efficiency Video Coding (HEVC), and Versatile Video Coding (VVC) standard. Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in either intra, inter or intra-block copy (IBC) modes. Video blocks in an intra coded (I) slice of a video frame are encoded using spatial prediction with respect to reference samples in neighboring blocks within the same video frame. Video blocks in an inter coded (P or B) slice of a video frame may use spatial prediction with respect to reference samples in neighboring blocks within the same video frame or temporal prediction with respect to reference samples in other previous and/or future reference video frames.

Spatial or temporal prediction based on a reference block that has been previously encoded, e.g., a neighboring block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a one-dimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

SUMMARY

The present application describes implementations related to video data encoding and decoding and, more particularly, to the improvements and simplifications of prediction in video coding.

According to a first aspect of the present application, a method of decoding a syntax element for a current coding unit of video data includes: identifying, for the current coding unit, an above coding unit and a coding tree unit including the current coding unit; in accordance with a determination that the above coding unit is within the coding tree unit, decoding, from a video bitstream, a corresponding syntax element for the current coding unit based, at least in part, on a syntax element associated with the above coding unit retrieved from a line buffer associated with the coding tree unit; and in accordance with a determination that the above coding unit is not within the coding tree unit, decoding, from the video bitstream, the corresponding syntax element for the current coding unit based, at least in part, on a default value assigned to the syntax element associated with the above coding unit.

According to a second aspect of the present application, a method of encoding a syntax element for a current coding unit of video data includes: identifying, for the current coding unit, an above coding unit and a coding tree unit including the current coding unit; in accordance with a determination that the above coding unit is within the coding tree unit, encoding, into a video bitstream, a corresponding syntax element for the current coding unit based, at least in part, on a syntax element associated with the above coding unit retrieved from a line buffer associated with the coding tree unit; and in accordance with a determination that the above coding unit is not within the coding tree unit, encoding, into the video bitstream, the corresponding syntax element for the current coding unit based, at least in part, on a default value assigned to the syntax element associated with the above coding unit.

According to a third aspect of the present application, an electronic apparatus includes one or more processing units, memory and a plurality of programs stored in the memory. The programs, when executed by the one or more processing units, cause the electronic apparatus to perform the methods of decoding or encoding a syntax element for a current coding unit of video data as described above.

According to a fourth aspect of the present application, a non-transitory computer readable storage medium stores a plurality of programs for execution by an electronic apparatus having one or more processing units. The programs, when executed by the one or more processing units, cause the electronic apparatus to perform the methods of decoding or encoding a syntax element for a current coding unit of video data as described above.

BRIEF DESCRIPTION OF DRAWINGS

The accompanying drawings, which are included to provide a further understanding of the implementations and are incorporated herein and constitute a part of the specification, illustrate the described implementations and together with the description serve to explain the underlying principles. Like reference numerals refer to corresponding parts.

FIG. 6A is a flowchart illustrating an exemplary process by which a video encoder implements the techniques of encoding a syntax element for a current coding unit of video data in accordance with some implementations of the present disclosure.

FIG. 6B is a flowchart illustrating an exemplary process by which a video decoder implements the techniques of decoding a syntax element for a current coding unit of video data in accordance with some implementations of the present disclosure.

DETAILED DESCRIPTION

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used without departing from the scope of claims and the subject matter may be practiced without these specific details. For example, it will be apparent to one of ordinary skill in the art that the subject matter presented herein can be implemented on many types of electronic devices with digital video capabilities.

Figure 1:
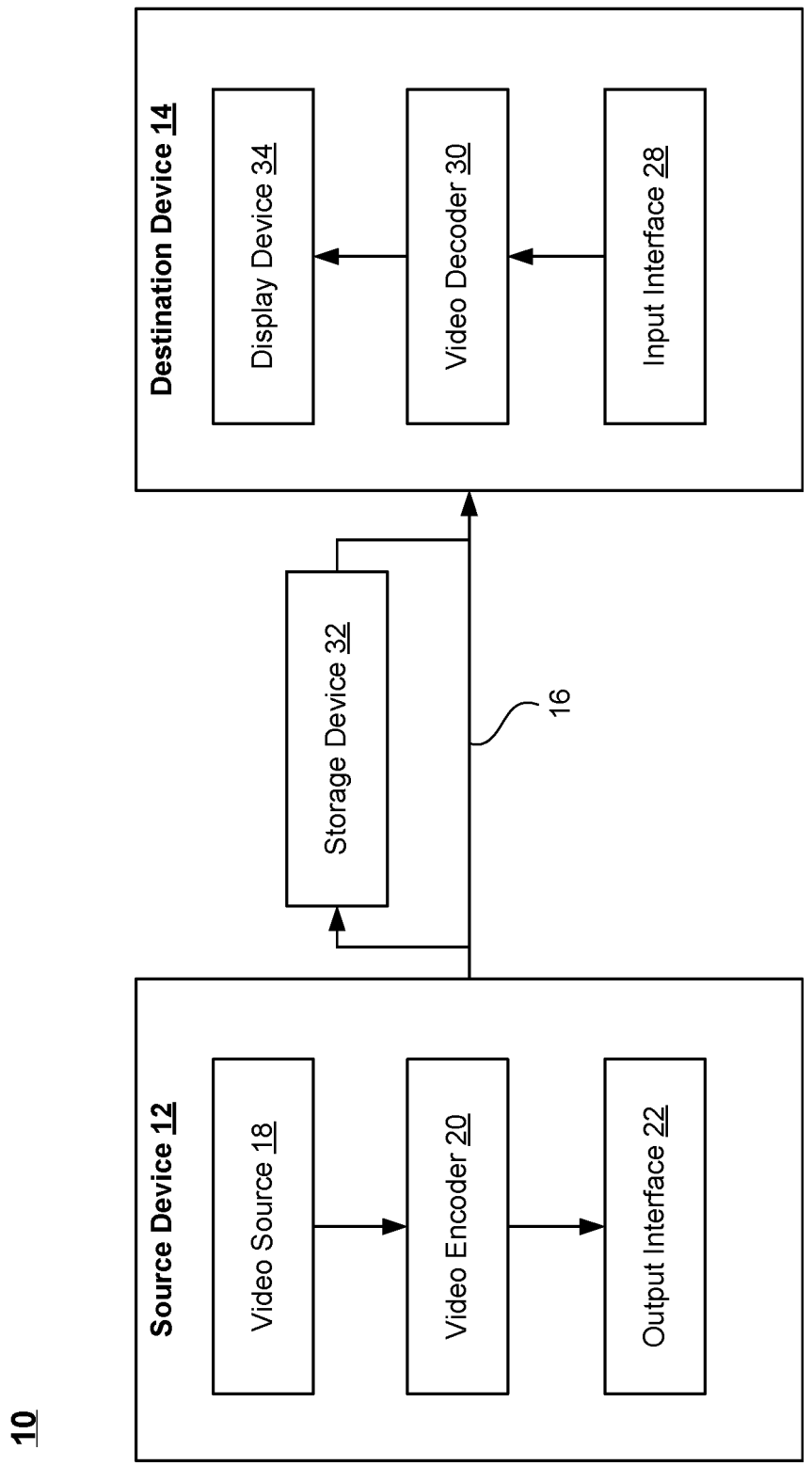
FIG. 1 is a block diagram illustrating an exemplary video encoding and decoding system in accordance with some implementations of the present disclosure.

FIG. 1 is a block diagram illustrating an exemplary system 10 for encoding and decoding video blocks in parallel in accordance with some implementations of the present disclosure. As shown in FIG. 1, system 10 includes a source device 12 that generates and encodes video data to be decoded subsequently by a destination device 14. Source device 12 and destination device 14 may comprise any of a wide variety of electronic devices, including desktop or laptop computers, tablet computers, smart phones, set-top boxes, digital televisions, cameras, display devices, digital media players, video gaming consoles, video streaming device, or the like. In some implementations, source device 12 and destination device 14 are equipped with wireless communication capabilities.

In some implementations, destination device 14 may receive the encoded video data to be decoded via a link 16. Link 16 may comprise any type of communication medium or device capable of moving the encoded video data from source device 12 to destination device 14. In one example, link 16 may comprise a communication medium to enable source device 12 to transmit the encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some other implementations, the encoded video data may be transmitted from output interface 22 to a storage device 32. Subsequently, the encoded video data in storage device 32 may be accessed by destination device 14 via input interface 28. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may hold the encoded video data generated by source device 12. Destination device 14 may access the stored video data from storage device 32 via streaming or downloading. The file server may be any type of computer capable of storing encoded video data and transmitting the encoded video data to destination device 14. Exemplary file servers include a web server (e.g., for a website), an FTP server, network attached storage (NAS) devices, or a local disk drive. Destination device 14 may access the encoded video data through any standard data connection, including a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination of both.

As shown in FIG. 1, source device 12 includes a video source 18, a video encoder 20 and an output interface 22. Video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera of a security surveillance system, source device 12 and destination device 14 may form camera phones or video phones. However, the implementations described in the present application may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 32 for later access by destination device 14 or other devices, for decoding and/or playback. Output interface 22 may further include a modem and/or a transmitter.

Destination device 14 includes an input interface 28, a video decoder 30, and a display device 34. Input interface 28 may include a receiver and/or a modem and receive the encoded video data over link 16. The encoded video data communicated over link 16, or provided on storage device 32, may include a variety of syntax elements generated by video encoder 20 for use by video decoder 30 in decoding the video data. Such syntax elements may be included within the encoded video data transmitted on a communication medium, stored on a storage medium, or stored a file server.

In some implementations, destination device 14 may include a display device 34, which can be an integrated display device and an external display device that is configured to communicate with destination device 14. Display device 34 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to proprietary or industry standards, such as VVC, HEVC, MPEG-4, Part 10, Advanced Video Coding (AVC), or extensions of such standards. It should be understood that the present application is not limited to a specific video coding/decoding standard and may be applicable to other video coding/decoding standards. It is generally contemplated that video encoder 20 of source device 12 may be configured to encode video data according to any of these current or future standards. Similarly, it is also generally contemplated that video decoder 30 of destination device 14 may be configured to decode video data according to any of these current or future standards.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of video encoder 20 and video decoder 30 may be included in one or more encoders or decoders, either of which may be integrated as part of a combined encoder/decoder (CODEC) in a respective device.

Figure 2:
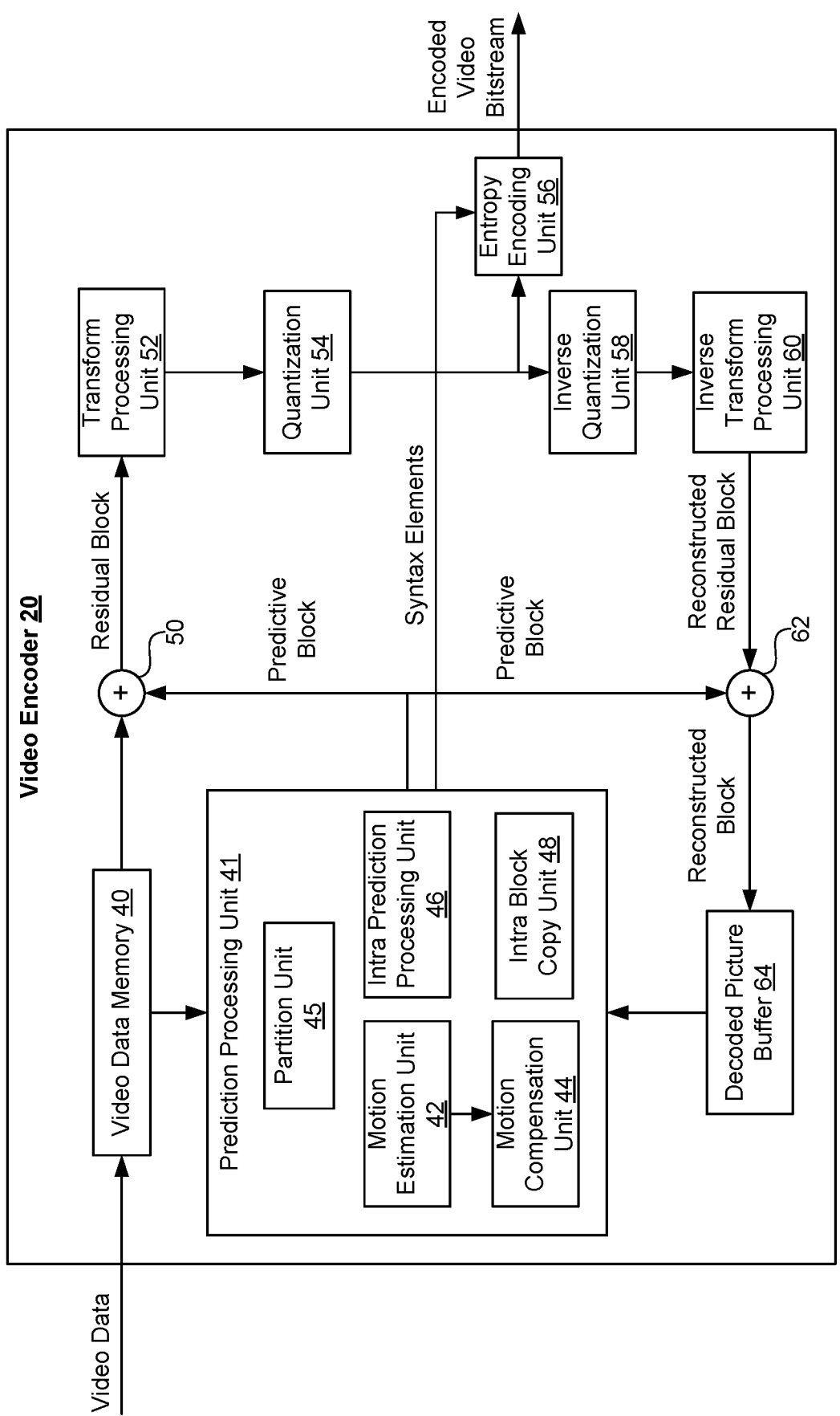
FIG. 2 is a block diagram illustrating an exemplary video encoder in accordance with some implementations of the present disclosure.

FIG. 2 is a block diagram illustrating an exemplary video encoder 20 in accordance with some implementations described in the present application. Video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, video encoder 20 includes video data memory 40, prediction processing unit 41, decoded picture buffer (DPB) 64, summer 50, transform processing unit 52, quantization unit 54, and entropy encoding unit 56. Prediction processing unit 41 further includes motion estimation unit 42, motion compensation unit 44, partition unit 45, intra prediction processing unit 46, and intra block copy (BC) unit 48. In some implementations, video encoder 20 also includes inverse quantization unit 58, inverse transform processing unit 60, and summer 62 for video block reconstruction. A deblocking filter (not shown) may be positioned between summer 62 and DPB 64 to filter block boundaries to remove blockiness artifacts from reconstructed video. An in loop filter (not shown) may also be used in addition to the deblocking filter to filter the output of summer 62. Video encoder 20 may take the form of a fixed or programmable hardware unit or may be divided among one or more of the illustrated fixed or programmable hardware units.

Video data memory 40 may store video data to be encoded by the components of video encoder 20. The video data in video data memory 40 may be obtained, for example, from video source 18. DPB 64 is a buffer that stores reference video data for use in encoding video data by video encoder 20 (e.g., in intra or inter predictive coding modes). Video data memory 40 and DPB 64 may be formed by any of a variety of memory devices. In various examples, video data memory 40 may be on-chip with other components of video encoder 20, or off-chip relative to those components.

As shown in FIG. 2, after receiving video data, partition unit 45 within prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). Prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). Prediction processing unit 41 may provide the resulting intra or inter prediction coded block to summer 50 to generate a residual block and to summer 62 to reconstruct the encoded block for use as part of a reference frame subsequently. Prediction processing unit 41 also provides syntax elements, such as motion vectors, intra-mode indicators, partition information, and other such syntax information, to entropy encoding unit 56.

In order to select an appropriate intra predictive coding mode for the current video block, intra prediction processing unit 46 within prediction processing unit 41 may perform intra predictive coding of the current video block relative to one or more neighboring blocks in the same frame as the current block to be coded to provide spatial prediction. Motion estimation unit 42 and motion compensation unit 44 within prediction processing unit 41 perform inter predictive coding of the current video block relative to one or more predictive blocks in one or more reference frames to provide temporal prediction. Video encoder 20 may perform multiple coding passes, e.g., to select an appropriate coding mode for each block of video data.

In some implementations, motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. Intra BC unit 48 may determine vectors, e.g., block vectors, for intra BC coding in a manner similar to the determination of motion vectors by motion estimation unit 42 for inter prediction, or may utilize motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, video encoder 20 may calculate values for sub-integer pixel positions of reference frames stored in DPB 64. For example, video encoder 20 may interpolate values of one-quarter pixel positions, one-eighth pixel positions, or other fractional pixel positions of the reference frame. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter prediction coded frame by comparing the position of the PU to the position of a predictive block of a reference frame selected from a first reference frame list (List 0) or a second reference frame list (List 1), each of which identifies one or more reference frames stored in DPB 64. Motion estimation unit 42 sends the calculated motion vector to motion compensation unit 44 and then to entropy encoding unit 56.

Motion compensation, performed by motion compensation unit 44, may involve fetching or generating the predictive block based on the motion vector determined by motion estimation unit 42. Upon receiving the motion vector for the PU of the current video block, motion compensation unit 44 may locate a predictive block to which the motion vector points in one of the reference frame lists, retrieve the predictive block from DPB 64, and forward the predictive block to summer 50. Summer 50 then forms a residual video block of pixel difference values by subtracting pixel values of the predictive block provided by motion compensation unit 44 from the pixel values of the current video block being coded. The pixel difference values forming the residual vide block may include luma or chroma difference components or both. Motion compensation unit 44 may also generate syntax elements associated with the video blocks of a video frame for use by video decoder 30 in decoding the video blocks of the video frame. The syntax elements may include, for example, syntax elements defining the motion vector used to identify the predictive block, any flags indicating the prediction mode, or any other syntax information described herein. Note that motion estimation unit 42 and motion compensation unit 44 may be highly integrated, but are illustrated separately for conceptual purposes.

In some implementations, intra BC unit 48 may generate vectors and fetch predictive blocks in a manner similar to that described above in connection with motion estimation unit 42 and motion compensation unit 44, but with the predictive blocks being in the same frame as the current block being coded and with the vectors being referred to as block vectors as opposed to motion vectors. In particular, intra BC unit 48 may determine an intra-prediction mode to use to encode a current block. In some examples, intra BC unit 48 may encode a current block using various intra-prediction modes, e.g., during separate encoding passes, and test their performance through rate-distortion analysis. Next, intra BC unit 48 may select, among the various tested intra-prediction modes, an appropriate intra-prediction mode to use and generate an intra-mode indicator accordingly. For example, intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bitrate (i.e., a number of bits) used to produce the encoded block. Intra BC unit 48 may calculate ratios from the distortions and rates for the various encoded blocks to determine which intra-prediction mode exhibits the best rate-distortion value for the block.

In other examples, intra BC unit 48 may use motion estimation unit 42 and motion compensation unit 44, in whole or in part, to perform such functions for Intra BC prediction according to the implementations described herein. In either case, for Intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to intra prediction, or a different frame according to inter prediction, video encoder 20 may form a residual video block by subtracting pixel values of the predictive block from the pixel values of the current video block being coded, forming pixel difference values. The pixel difference values forming the residual video block may include both luma and chroma component differences.

Intra prediction processing unit 46 may intra-predict a current video block, as an alternative to the inter-prediction performed by motion estimation unit 42 and motion compensation unit 44, or the intra block copy prediction performed by intra BC unit 48, as described above. In particular, intra prediction processing unit 46 may determine an intra prediction mode to use to encode a current block. To do so, intra prediction processing unit 46 may encode a current block using various intra prediction modes, e.g., during separate encoding passes, and intra prediction processing unit 46 (or a mode select unit, in some examples) may select an appropriate intra prediction mode to use from the tested intra prediction modes. Intra prediction processing unit 46 may provide information indicative of the selected intra-prediction mode for the block to entropy encoding unit 56. Entropy encoding unit 56 may encode the information indicating the selected intra-prediction mode in the bitstream.

After prediction processing unit 41 determines the predictive block for the current video block via either inter prediction or intra prediction, summer 50 forms a residual video block by subtracting the predictive block from the current video block. The residual video data in the residual block may be included in one or more transform units (TUs) and is provided to transform processing unit 52. Transform processing unit 52 transforms the residual video data into residual transform coefficients using a transform, such as a discrete cosine transform (DCT) or a conceptually similar transform.

Transform processing unit 52 may send the resulting transform coefficients to quantization unit 54. Quantization unit 54 quantizes the transform coefficients to further reduce bit rate. The quantization process may also reduce the bit depth associated with some or all of the coefficients. The degree of quantization may be modified by adjusting a quantization parameter. In some examples, quantization unit 54 may then perform a scan of a matrix including the quantized transform coefficients. Alternatively, entropy encoding unit 56 may perform the scan.

Following quantization, entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to video decoder 30, or archived in storage device 32 for later transmission to or retrieval by video decoder 30. Entropy encoding unit 56 may also entropy encode the motion vectors and the other syntax elements for the current video frame being coded.

Inverse quantization unit 58 and inverse transform processing unit 60 apply inverse quantization and inverse transformation, respectively, to reconstruct the residual video block in the pixel domain for generating a reference block for prediction of other video blocks. As noted above, motion compensation unit 44 may generate a motion compensated predictive block from one or more reference blocks of the frames stored in DPB 64. Motion compensation unit 44 may also apply one or more interpolation filters to the predictive block to calculate sub-integer pixel values for use in motion estimation.

Summer 62 adds the reconstructed residual block to the motion compensated predictive block produced by motion compensation unit 44 to produce a reference block for storage in DPB 64. The reference block may then be used by intra BC unit 48, motion estimation unit 42 and motion compensation unit 44 as a predictive block to inter predict another video block in a subsequent video frame.

Figure 3:
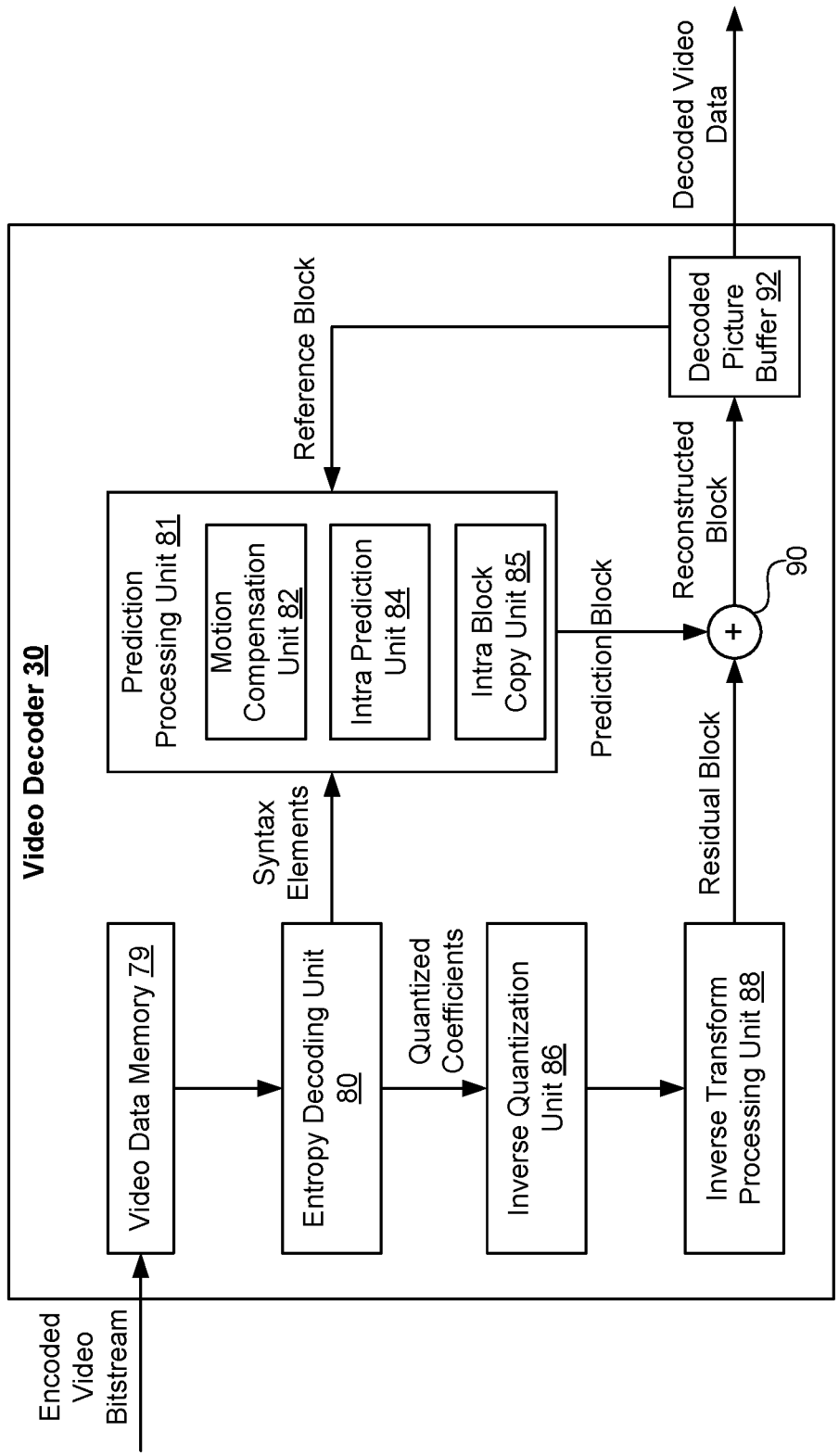
FIG. 3 is a block diagram illustrating an exemplary video decoder in accordance with some implementations of the present disclosure.

FIG. 3 is a block diagram illustrating an exemplary video decoder 30 in accordance with some implementations of the present application. Video decoder 30 includes video data memory 79, entropy decoding unit 80, prediction processing unit 81, inverse quantization unit 86, inverse transform processing unit 88, summer 90, and DPB 92. Prediction processing unit 81 further includes motion compensation unit 82, intra prediction unit 84, and intra BC unit 85. Video decoder 30 may perform a decoding process generally reciprocal to the encoding process described above with respect to video encoder 20 in connection with FIG. 2. For example, motion compensation unit 82 may generate prediction data based on motion vectors received from entropy decoding unit 80, while intra-prediction unit 84 may generate prediction data based on intra-prediction mode indicators received from entropy decoding unit 80.

In some examples, a unit of video decoder 30 may be tasked to perform the implementations of the present application. Also, in some examples, the implementations of the present disclosure may be divided among one or more of the units of video decoder 30. For example, intra BC unit 85 may perform the implementations of the present application, alone, or in combination with other units of video decoder 30, such as motion compensation unit 82, intra prediction unit 84, and entropy decoding unit 80. In some examples, video decoder 30 may not include intra BC unit 85 and the functionality of intra BC unit 85 may be performed by other components of prediction processing unit 81, such as motion compensation unit 82.

Video data memory 79 may store video data, such as an encoded video bitstream, to be decoded by the other components of video decoder 30. The video data stored in video data memory 79 may be obtained, for example, from storage device 32, from a local video source, such as a camera, via wired or wireless network communication of video data, or by accessing physical data storage media (e.g., a flash drive or hard disk). Video data memory 79 may include a coded picture buffer (CPB) that stores encoded video data from an encoded video bitstream. Decoded picture buffer (DPB) 92 of video decoder 30 stores reference video data for use in decoding video data by video decoder 30 (e.g., in intra or inter predictive coding modes). Video data memory 79 and DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, video data memory 79 and DPB 92 are depicted as two distinct components of video decoder 30 in FIG. 3. But it will be apparent to one skilled in the art that video data memory 79 and DPB 92 may be provided by the same memory device or separate memory devices. In some examples, video data memory 79 may be on-chip with other components of video decoder 30, or off-chip relative to those components.

During the decoding process, video decoder 30 receives an encoded video bitstream that represents video blocks of an encoded video frame and associated syntax elements. Video decoder 30 may receive the syntax elements at the video frame level and/or the video block level. Entropy decoding unit 80 of video decoder 30 entropy decodes the bitstream to generate quantized coefficients, motion vectors or intra-prediction mode indicators, and other syntax elements. Entropy decoding unit 80 then forwards the motion vectors and other syntax elements to prediction processing unit 81.

When the video frame is coded as an intra predictive coded (I) frame or for intra coded predictive blocks in other types of frames, intra prediction unit 84 of prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, motion compensation unit 82 of prediction processing unit 81 produces one or more predictive blocks for a video block of the current video frame based on the motion vectors and other syntax elements received from entropy decoding unit 80. Each of the predictive blocks may be produced from a reference frame within one of the reference frame lists. Video decoder 30 may construct the reference frame lists, List 0 and List 1, using default construction techniques based on reference frames stored in DPB 92.

In some examples, when the video block is coded according to the intra BC mode described herein, intra BC unit 85 of prediction processing unit 81 produces predictive blocks for the current video block based on block vectors and other syntax elements received from entropy decoding unit 80. The predictive blocks may be within a reconstructed region of the same picture as the current video block defined by video encoder 20.

Motion compensation unit 82 and/or intra BC unit 85 determines prediction information for a video block of the current video frame by parsing the motion vectors and other syntax elements, and then uses the prediction information to produce the predictive blocks for the current video block being decoded. For example, motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, intra BC unit 85 may use some of the received syntax elements, e.g., a flag, to determine that the current video block was predicted using the intra BC mode, construction information of which video blocks of the frame are within the reconstructed region and should be stored in DPB 92, block vectors for each intra BC predicted video block of the frame, intra BC prediction status for each intra BC predicted video block of the frame, and other information to decode the video blocks in the current video frame.

Motion compensation unit 82 may also perform interpolation using the interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes the quantized transform coefficients provided in the bitstream and entropy decoded by entropy decoding unit 80 using the same quantization parameter calculated by video encoder 20 for each video block in the video frame to determine a degree of quantization. Inverse transform processing unit 88 applies an inverse transform, e.g., an inverse DCT, an inverse integer transform, or a conceptually similar inverse transform process, to the transform coefficients in order to reconstruct the residual blocks in the pixel domain.

After motion compensation unit 82 or intra BC unit 85 generates the predictive block for the current video block based on the vectors and other syntax elements, summer 90 reconstructs decoded video block for the current video block by summing the residual block from inverse transform processing unit 88 and a corresponding predictive block generated by motion compensation unit 82 and intra BC unit 85. An in-loop filter (not pictured) may be positioned between summer 90 and DPB 92 to further process the decoded video block. The decoded video blocks in a given frame are then stored in DPB 92, which stores reference frames used for subsequent motion compensation of next video blocks. DPB 92, or a memory device separate from DPB 92, may also store decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4A:
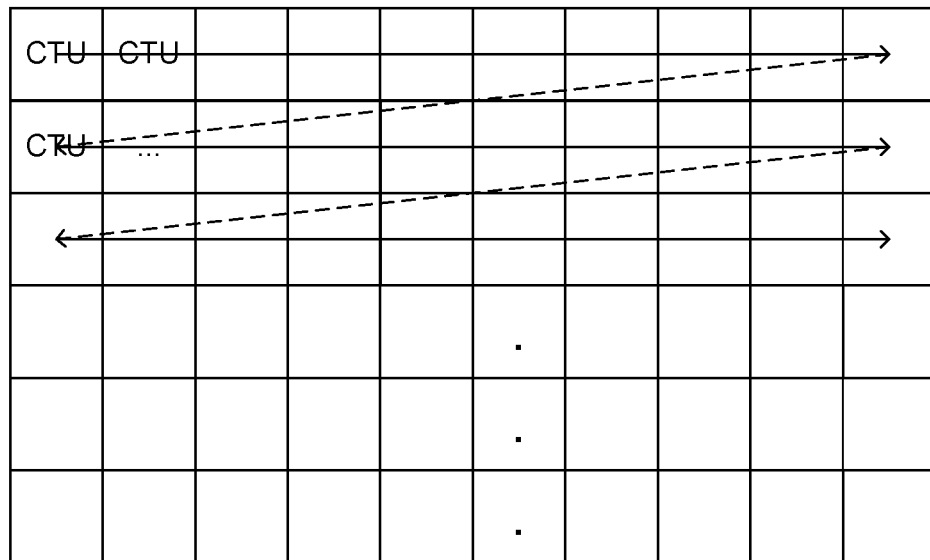
FIGS. 4A through 4E are block diagrams illustrating how a frame is recursively partitioned into multiple video blocks of different sizes and shapes in accordance with some implementations of the present disclosure.
Figure 4B:
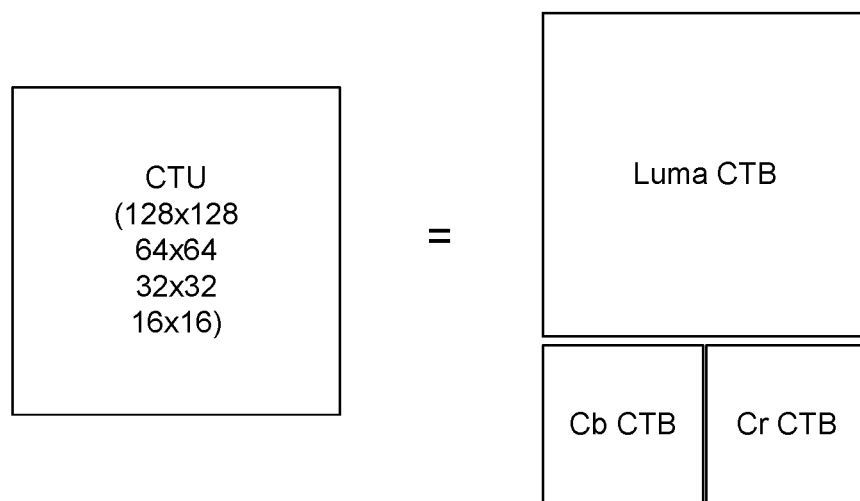

As shown in FIG. 4A, video encoder 20 (or more specifically partition unit 45) generates an encoded representation of a frame by first partitioning the frame into a set of coding tree units (CTUs). A video frame may include an integer number of CTUs ordered consecutively in a raster scan order from left to right and from top to bottom. Each CTU is a largest logical coding unit and the width and height of the CTU are signaled by the video encoder 20 in a sequence parameter set, such that all the CTUs in a video sequence have the same size being one of 128×128, 64×64, 32×32, and 16×16. But it should be noted that the present application is not necessarily limited to a particular size. As shown in FIG. 4B, each CTU may comprise one coding tree block (CTB) of luma samples, two corresponding coding tree blocks of chroma samples, and syntax elements used to code the samples of the coding tree blocks. The syntax elements describe properties of different types of units of a coded block of pixels and how the video sequence can be reconstructed at the video decoder 30, including inter or intra prediction, intra prediction mode, motion vectors, and other parameters. In monochrome pictures or pictures having three separate color planes, a CTU may comprise a single coding tree block and syntax elements used to code the samples of the coding tree block. A coding tree block may be an N×N block of samples.

Figure 4C:
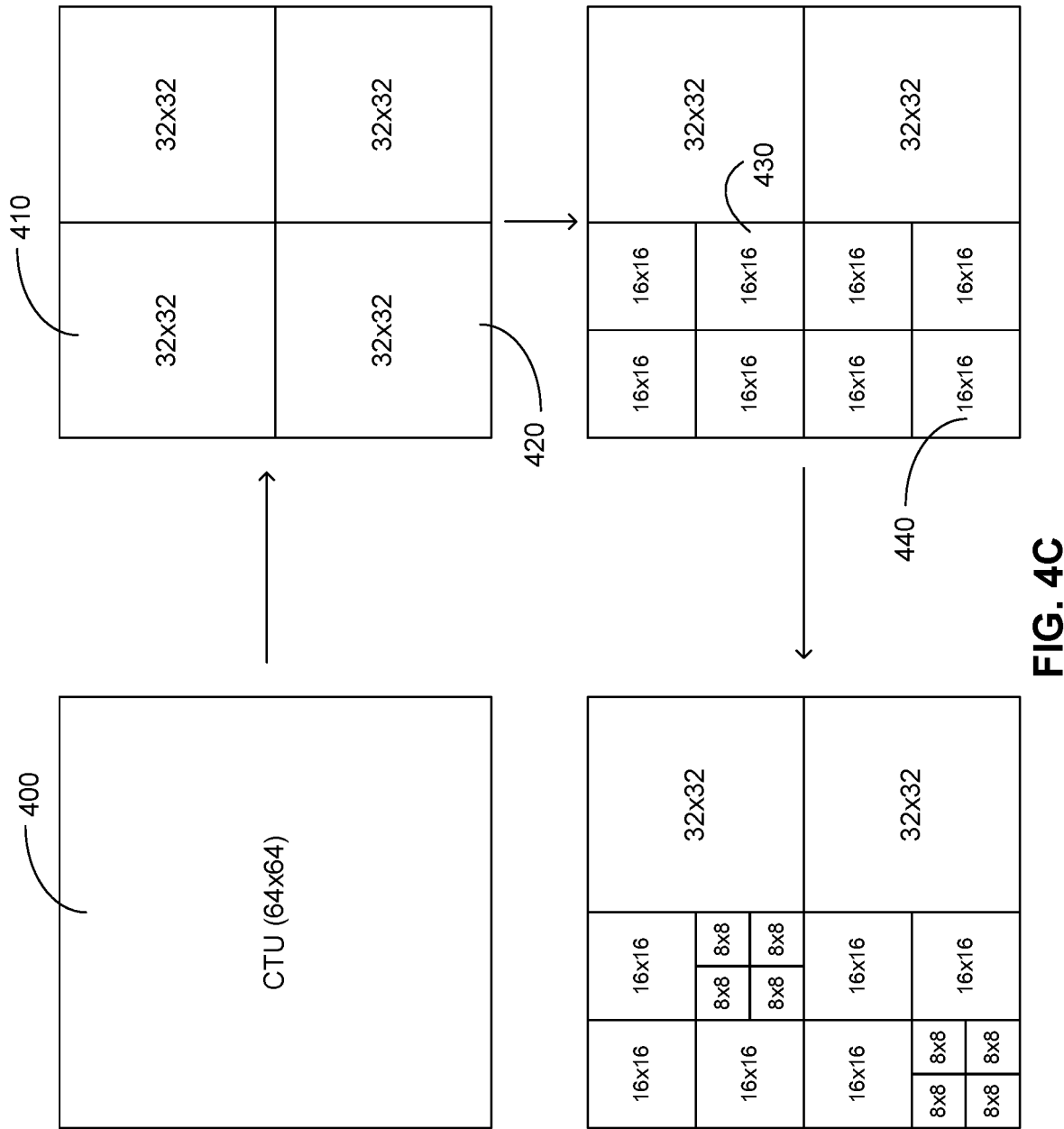
Figure 4D:
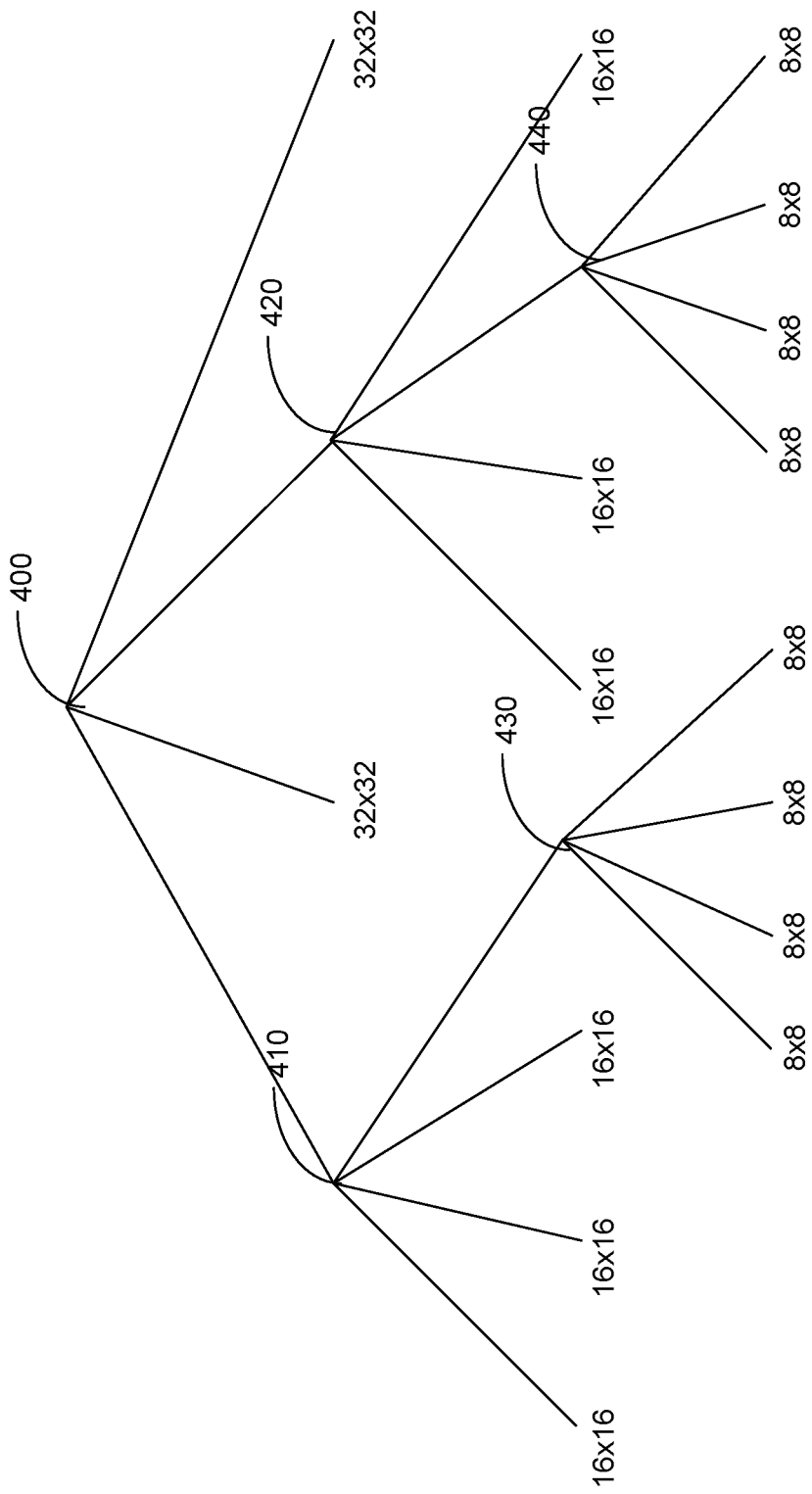
Figure 4E:
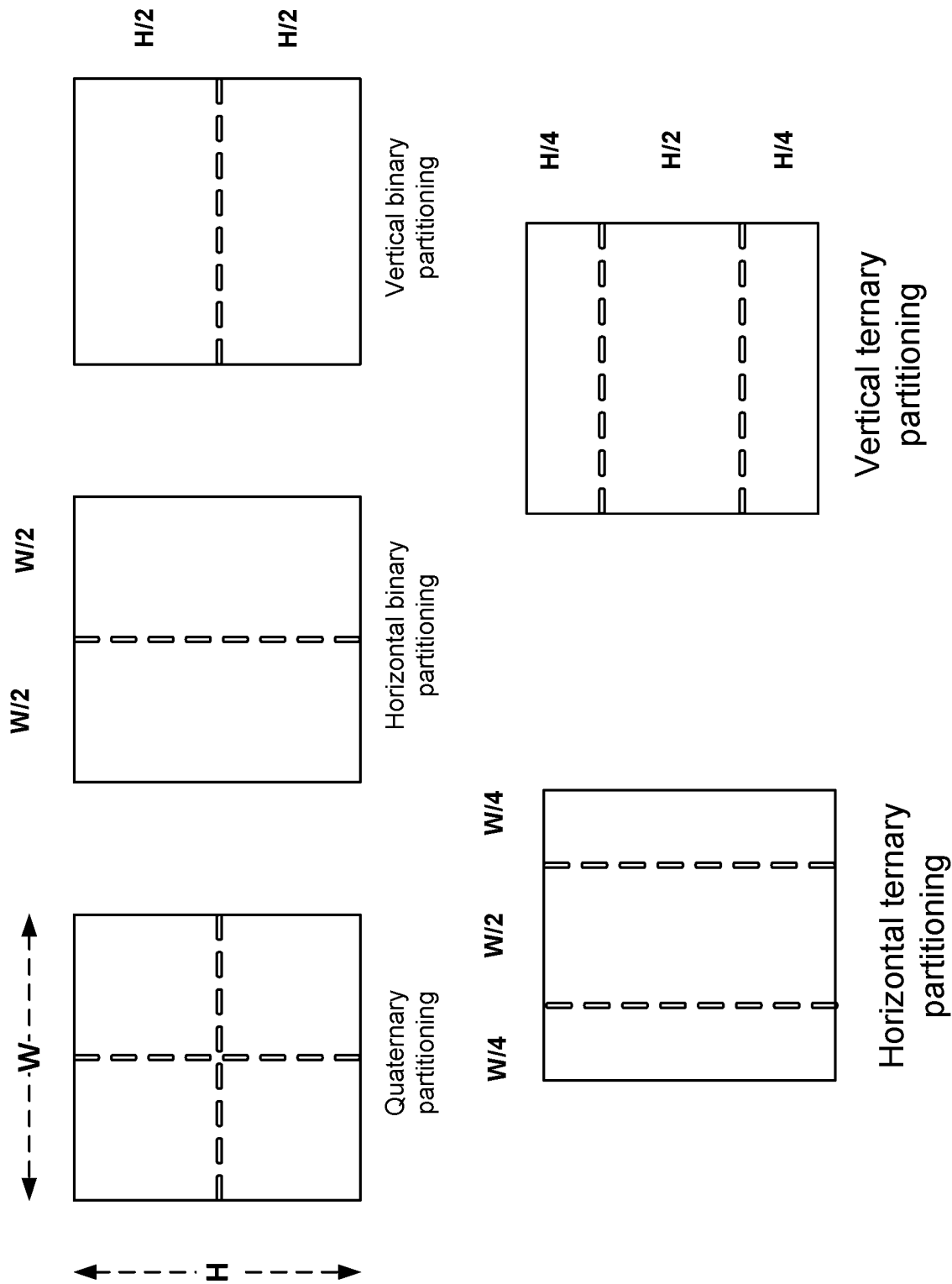

To achieve a better performance, video encoder 20 may recursively perform tree partitioning such as binary-tree partitioning, ternary-tree partitioning, quad-tree partitioning or a combination of both on the coding tree blocks of the CTU and divide the CTU into smaller coding units (CUs). As depicted in FIG. 4C, the 64×64 CTU 400 is first divided into four smaller CU, each having a block size of 32×32. Among the four smaller CUs, CU 410 and CU 420 are each divided into four CUs of 16×16 by block size. The two 16×16 CUs 430 and 440 are each further divided into four CUs of 8×8 by block size. FIG. 4D depicts a quad-tree data structure illustrating the end result of the partition process of the CTU 400 as depicted in FIG. 4C, each leaf node of the quad-tree corresponding to one CU of a respective size ranging from 32×32 to 8×8. Like the CTU depicted in FIG. 4B, each CU may comprise a coding block (CB) of luma samples and two corresponding coding blocks of chroma samples of a frame of the same size, and syntax elements used to code the samples of the coding blocks. In monochrome pictures or pictures having three separate color planes, a CU may comprise a single coding block and syntax structures used to code the samples of the coding block. It should be noted that the quad-tree partitioning depicted in FIGS. 4C and 4D is only for illustrative purposes and one CTU can be split into CUs to adapt to varying local characteristics based on quad/ternary/binary-tree partitions. In the multi-type tree structure, one CTU is partitioned by a quad-tree structure and each quad-tree leaf CU can be further partitioned by a binary and ternary tree structure. As shown in FIG. 4E, there are five partitioning types, i.e., quaternary partitioning, horizontal binary partitioning, vertical binary partitioning, horizontal ternary partitioning, and vertical ternary partitioning.

In some implementations, video encoder 20 may further partition a coding block of a CU into one or more M×N prediction blocks (PB). A prediction block is a rectangular (square or non-square) block of samples on which the same prediction, inter or intra, is applied. A prediction unit (PU) of a CU may comprise a prediction block of luma samples, two corresponding prediction blocks of chroma samples, and syntax elements used to predict the prediction blocks. In monochrome pictures or pictures having three separate color planes, a PU may comprise a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the frame associated with the PU. If video encoder 20 uses inter prediction to generate the predictive blocks of a PU, video encoder 20 may generate the predictive blocks of the PU based on decoded samples of one or more frames other than the frame associated with the PU.

After video encoder 20 generates predictive luma, Cb, and Cr blocks for one or more PUs of a CU, video encoder 20 may generate a luma residual block for the CU by subtracting the CU's predictive luma blocks from its original luma coding block such that each sample in the CU's luma residual block indicates a difference between a luma sample in one of the CU's predictive luma blocks and a corresponding sample in the CU's original luma coding block. Similarly, video encoder 20 may generate a Cb residual block and a Cr residual block for the CU, respectively, such that each sample in the CU's Cb residual block indicates a difference between a Cb sample in one of the CU's predictive Cb blocks and a corresponding sample in the CU's original Cb coding block and each sample in the CU's Cr residual block may indicate a difference between a Cr sample in one of the CU's predictive Cr blocks and a corresponding sample in the CU's original Cr coding block.

Furthermore, as illustrated in FIG. 4C, video encoder 20 may use quad-tree partitioning to decompose the luma, Cb, and Cr residual blocks of a CU into one or more luma, Cb, and Cr transform blocks. A transform block is a rectangular (square or non-square) block of samples on which the same transform is applied. A transform unit (TU) of a CU may comprise a transform block of luma samples, two corresponding transform blocks of chroma samples, and syntax elements used to transform the transform block samples. Thus, each TU of a CU may be associated with a luma transform block, a Cb transform block, and a Cr transform block. In some examples, the luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients. Finally, video encoder 20 may output a bitstream that includes a sequence of bits that forms a representation of coded frames and associated data, which is either saved in storage device 32 or transmitted to destination device 14.

After receiving a bitstream generated by video encoder 20, video decoder 30 may parse the bitstream to obtain syntax elements from the bitstream. Video decoder 30 may reconstruct the frames of the video data based at least in part on the syntax elements obtained from the bitstream. The process of reconstructing the video data is generally reciprocal to the encoding process performed by video encoder 20. For example, video decoder 30 may perform inverse transforms on the coefficient blocks associated with TUs of a current CU to reconstruct residual blocks associated with the TUs of the current CU. Video decoder 30 also reconstructs the coding blocks of the current CU by adding the samples of the predictive blocks for PUs of the current CU to corresponding samples of the transform blocks of the TUs of the current CU. After reconstructing the coding blocks for each CU of a frame, video decoder 30 may reconstruct the frame.

As noted above in connection with FIG. 2, the encoding process of video data ends with entropy encoding unit 56 encoding the quantized transform coefficients of a current video frame as well as the associated motion vectors (if inter predicted) and other syntax elements associated with the current video frame being coded into a video bitstream using one of many existing coding schemes, one of which is context adaptive binary arithmetic coding (CABAC). CABAC is based on arithmetic coding and it encodes binary symbols based on probability modelling for more frequently used bits of any symbol. The probability models are selected adaptively based on local context, allowing better modelling of probabilities, because coding modes are usually locally well correlated. CABAC has multiple probability modes for different contexts. It first converts all non-binary symbols to binary. Then, for each bit, the coder selects which probability model to use, then uses information from neighboring elements to optimize the probability estimate. Arithmetic coding is finally applied to compress the data. The context modeling provides estimates of conditional probabilities of the coding symbols. Utilizing suitable context models, a given inter-symbol redundancy can be exploited by switching between different probability models according to already-coded symbols in the neighborhood of the current symbol to encode.

Figure 5:
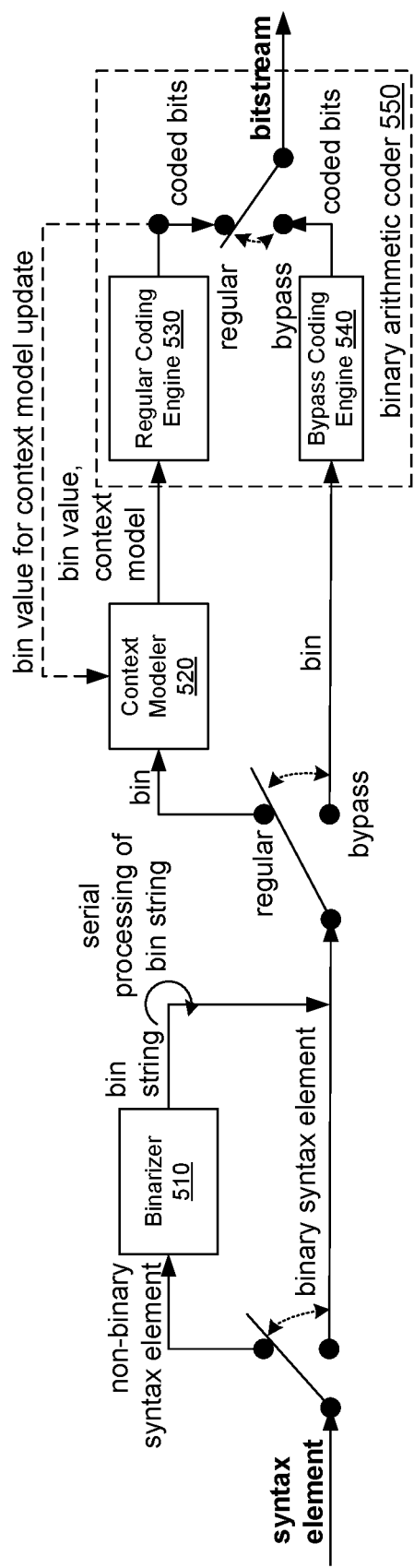
FIG. 5 is a block diagram illustrating an example of performing context-based encoding of syntax elements in accordance with some implementations of the present disclosure.

FIG. 5 is a block diagram illustrating how to encode syntax elements using the CABAC scheme in accordance with some implementations of the present disclosure. In this example, entropy encoding unit 56 includes a binarizer 510 for converting a non-binary syntax element (e.g., a transform coefficient or a motion vector element) into a binary string; a context modeler 520 for choosing a context model for a binary bin to be encoded based on a statistical analysis; and a binary arithmetic coder 550 for coding the bin value and/or the context model.

As depicted in FIG. 5, a given non-binary valued syntax element is uniquely mapped by the binarizer 510 to a binary sequence, also referred to as "bin string". This process is similar to the process of converting a data symbol into a variable length code but the binary code is further encoded (by the arithmetic coder) prior to transmission. When a binary valued syntax element is given, this initial step is bypassed. For each element of the bin string or for each binary valued syntax element, one or two subsequent steps may follow depending on the coding mode.

In the regular coding mode, before the actual arithmetic coding process performed by the regular coding engine 530, a given bin enters the context modeling stage, where the context model 520 selects a probability model for the bin depending on the statistics of previously encoded syntax elements or bins. The context model stores the probability of each bin being "1" or "0". The selected context model is also updated based on the actual coded value (e.g., if the bin value was "1", the frequency count of "1"s in the model is increased). After the selection of a context model, the bin value along with its associated context model is passed to the regular coding engine 530, where the final stage of arithmetic encoding together with a subsequent model updating takes place.

Alternatively, if the bypass coding mode is chosen for a selected bin, e.g., to allow a speedup of the whole encoding (and decoding) process, the selected bin is processed by a simplified bypass coding engine 540 without using an explicitly selected probability model, as illustrated by the lower right branch of the switch in FIG. 5.

For example, if a current CU is coded in an intra prediction mode, a syntax element, e.g., a binary flag of 1, may be generated for indicating that the current CU is coded in the intra prediction mode and encoded into the video bitstream such that, when the video bitstream is decoded by video decoder 30, the same syntax element indicating the intra prediction mode can be retrieved from the video bitstream and used for reconstructing the current CU at video decoder 30. During the encoding of the syntax flag representing the intra prediction mode (or lack thereof) associated with the current CU, entropy encoding unit 56 (or more specifically, context modeler 520) needs to determine a context model for the current CU. In some embodiments, the context model is represented by a context index of one of multiple context models managed by context modeler 520. To determine the statistically most efficient context index, context modeler 520 may need to access the syntax elements representing the intra prediction mode of neighboring CUs of the current CU including, e.g., the left CU and the above CU of the current CU. In some implementations, a line buffer is used by entropy encoding unit 56 for caching such parameters when determining a context model for a syntax element of a current CU. As a result, the more syntax elements entropy encoding unit 56 encodes, the more space required in the line buffer for caching the corresponding syntax elements of neighboring blocks.

In some embodiments, it is proposed to reduce the reliance upon the syntax elements of neighboring CUs when determining the corresponding syntax elements for the current CU. For example, a line buffer is defined as being uniquely associated with a CTU including the current CU. After the last CU in the CTU is encoded, the line buffer is reset to be empty for the next CTU. In other words, when the above CU of the current CU is not within the same CTU, context modeler 520 does not need to query the line buffer for the corresponding syntax element for helping determine the context index of the current CU. As such, the size of the line buffer allocated for determining the context model of the current CU can be reduced. Instead of retrieving the corresponding syntax element associated with the above CU from the line buffer, a default value of th corresponding syntax element is used by context modeler 520 for determining the context index of the current CU. For example, if the syntax element to be encoded is the intra prediction mode of the current CU, a default value of 0 or 1 may be used for representing the syntax element of the above CU. Of course, this default value of 0 or 1 may not always be the actual syntax element of the above CU. But the potential discrepancy between the default value and the actual syntax element of the above CU has little impact on the context model selection by the CABAC scheme while more space can be used for other functions than being allocated for the line buffer.

Besides the intra prediction mode flag of the current CU, there are other binary or non-binary syntax elements that can be handled in a similar manner whereby less space is allocated for the line buffer of the current CTU. That is, when the context modeler 520 determines, among multiple candidate context models, a context index pointing to one of them for the current CU, it retrieves the actual syntax element of the above CU only if the above CU and the current CU are within the same CTU. Otherwise, the context modeler 520 uses a default value as the syntax element of the above CU for determining the context index for the current CU for the encoding purpose.

For example, if the current CU is predicted in the matrix-based intra prediction (MBIP) mode, a MBIP flag is assigned to the current CU. In some implementations, one of four context models is used by context modeler 520 for coding the MBIP flag. The selection of this context model for the MBIP flag is not depending on the MBIP flag of above CU when the above CU is not located in the same CTU as current CU. In this case, the value of MBIP flag of the above CU can be assumed as a default value, e.g., 0 or 1. As a result, there is no need to store MBIP flag information in the line buffer. For example, if the MBIP flag of the left CU is 1 (i.e., the left CU is in a MBIP mode), the context index is set to be 1; otherwise, if the width of the current CU is larger than 2 times of the height of the current CU or the height of the current CU is larger than 2 times of the width, the context index is set to be 3.

In some embodiments, the IBC mode flag of the current CU indicates if the current CU is in an IBC mode or not. In order to calculate the context index of the IBC mode flag, the IBC mode flag of both the left and above neighboring blocks are used. But the selection of context model for the CABAC coding of the IBC mode flag is not depending on the actual IBC mode flag of above CU when the above CU is not in the same CTU as current CU. Instead, the value of IBC mode flag of the above CU is set to be a default value, e.g. 0 or 1.

In some embodiments, the selection of context model for the CABAC coding of a CU split flag is not depending on the width of above CU when the above CU is not located in the same CTU as current CU. As a result, there is no need to store the block width information of the above CU in the line buffer. Assume that cuAboveInsideCTU is set to true if the above CU exists and it is located in the same CTU as the current CU; otherwise, the variable is set to false. The selection of the context index (ctxItx) for the CU split flag is designed as illustrated below, with the initial value set to zero.

ctxIdx=(cuLeft && LeftHeight<CurrHeight)?1:0;

ctxIdx+=(cuAboveInsideCTU &&
    AboveWidth<CurrWidth)?1:0;

Note that the cuLeft indicates the availability of left CU. The LeftHeight and CurrHeight are the height of left and current CU, respectively. The AboveWidth and CurrWidth are the width of above and current CU, respectively.

In some embodiments, the quadtree (or QT) split flag indicates if the current CU is split based on the quadtree partition or based on binary/ternary tree partition. In order to calculate the context index (ctxIdx) of QT split flag, the QT partition depth of above and left CUs are used. The selection of context index for the CABAC coding of QT split flag is not depending on the QT partition depth of above CU when the above CU is not located in the same CTU as current CU. As a result, there is no need to store the above CUs' QT partition depth information in the line buffer. The selection of context index (ctxIdx) for the QT split flag is designed as illustrated below.

ctxIdx=(cuLeft && LeftQtDepth>CurrQtDepth)?1:0;

ctxIdx+=(!cuAboveInsideCTU)?1:
    (AboveQtDepth>CurrQtDepth)?1:0;

ctxIdx+=CurrQtDepth<2?0:3;

Note that the cuLeft indicates the availability of left CU. The LeftQtDepth, AboveQtDepth and CurrQtDepth are the numbers of applied quad-splits (i.e. QT split depth) of left, above and current CU, respectively.

In some embodiments, the affine flag indicates if the current CU is in an affine mode or not. In order to calculate the context index (ctxIdx) used for coding the affine flag, the affine flags of both the left and above CUs are used. The context selection for the CABAC coding of the affine flag is not depending on the affine flag of above CU when the above CU is not located in the same CTU as current CU. In this case, the value of affine flag of the above CU is set to having a default value, e.g. 0 or 1, in deriving the value of ctxIdx.

In some embodiments, the subblock merge flag indicates whether the subblock-based inter prediction parameters for the current CU are inferred from the neighboring blocks. In order to calculate the context index (ctxIdx) used for coding the subblock merge flag of the current CU, the affine flags of both the left and above CUs are used. The selection of context index for the CABAC coding of subblock merge flag is not depending on the affine flag of above CU when the above CU is not located in the same CTU as current CU. In this case, the value of affine flag of the above CU is set to having a default value, e.g. 0 or 1, in deriving the value of ctxIdx.

In some embodiments, in order to generate affine mode prediction, the motion vector from the above CU (if also affine coded) may be used as candidate. The above CU candidate is not used for affine mode prediction when the above CU is not in the same CTU as current CU. In this case, the value of affine mode flag of the above CU is set to having a default value, e.g., 0 or 1.

As a summary of the present disclosure, FIG. 6A is a flowchart illustrating an exemplary process 600 by which a video encoder 20 implements the techniques of encoding a syntax element for a current coding unit of video data in accordance with some implementations of the present disclosure.

Video encoder 20 identifies (610), for the current coding unit, an above coding unit and a coding tree unit including the current coding unit and then determines (620) whether the above coding unit is within the coding tree unit or not. If so (620—yes), video encoder 20 encodes (630), into a video bitstream, a corresponding syntax element for the current coding unit based, at least in part, on a syntax element associated with the above coding unit retrieved from a line buffer associated with the coding tree unit. In some embodiments, video encoder 20 updates (630-1) the corresponding syntax element for the current coding unit in accordance with a width comparison of the above coding unit and the current coding unit and the syntax element associated with the above coding unit retrieved from the line buffer. Then video encoder 20 determines (630-3) a context index of the current coding unit based on the updated corresponding syntax element for the current coding unit and encodes (630-5), into the video bitstream, the corresponding syntax element for the current coding unit in accordance with the context index of the current coding unit.

If not (620—no), video encoder 20 then encodes (640), into the video bitstream, the corresponding syntax element for the current coding unit based, at least in part, on a default value assigned to the syntax element associated with the above coding unit. In some embodiments, video encoder 20 updates (640-1) the corresponding syntax element for the current coding unit in accordance with a height comparison of a left coding unit of the current coding unit and the current coding unit and the default value assigned to the syntax element associated with the above coding unit. Next video encoder 20 determines (640-3) a context index of the current coding unit based on the updated corresponding syntax element for the current coding unit and encodes (640-5), into the video bitstream, the corresponding syntax element for the current coding unit in accordance with the context index of the current coding unit.

FIG. 6B is a flowchart illustrating an exemplary process 650 by which a video decoder 30 implements the techniques of decoding a syntax element for a current coding unit of video data in accordance with some implementations of the present disclosure.

Video decoder 30 identifies (660), for the current coding unit, an above coding unit and a coding tree unit including the current coding unit and then determines (670) whether the above coding unit is within the coding tree unit or not. If so (670—yes), video decoder 30 decodes (680), from a video bitstream, a corresponding syntax element for the current coding unit based, at least in part, on a syntax element associated with the above coding unit retrieved from a line buffer associated with the coding tree unit. In some embodiments, video decoder 30 updates (680-1) the corresponding syntax element for the current coding unit in accordance with a width comparison of the above coding unit and the current coding unit and the syntax element associated with the above coding unit retrieved from the line buffer. Then video decoder 30 determines (680-3) a context index of the current coding unit based on the updated corresponding syntax element for the current coding unit and decodes (680-5), from the video bitstream, the corresponding syntax element for the current coding unit in accordance with the context index of the current coding unit.

If not (670—no), video decoder 30 then decodes (690), from the video bitstream, the corresponding syntax element for the current coding unit based, at least in part, on a default value assigned to the syntax element associated with the above coding unit. In some embodiments, video decoder 30 updates (690-1) the corresponding syntax element for the current coding unit in accordance with a height comparison of a left coding unit of the current coding unit and the current coding unit and the default value assigned to the syntax element associated with the above coding unit. Next video decoder 30 determines (690-3) a context index of the current coding unit based on the updated corresponding syntax element for the current coding unit and decodes (690-5), from the video bitstream, the corresponding syntax element for the current coding unit in accordance with the context index of the current coding unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media that is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

The terminology used in the description of the implementations herein is for the purpose of describing particular implementations only and is not intended to limit the scope of claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, elements, and/or components, but do not preclude the presence or addition of one or more other features, elements, components, and/or groups thereof.

It will also be understood that, although the terms first, second, etc. may be used herein to describe various elements, these elements should not be limited by these terms. These terms are only used to distinguish one element from another. For example, a first electrode could be termed a second electrode, and, similarly, a second electrode could be termed a first electrode, without departing from the scope of the implementations. The first electrode and the second electrode are both electrodes, but they are not the same electrode.

The description of the present application has been presented for purposes of illustration and description, and is not intended to be exhaustive or limited to the invention in the form disclosed. Many modifications, variations, and alternative implementations will be apparent to those of ordinary skill in the art having the benefit of the teachings presented in the foregoing descriptions and the associated drawings. The embodiment was chosen and described in order to best explain the principles of the invention, the practical application, and to enable others skilled in the art to understand the invention for various implementations and to best utilize the underlying principles and various implementations with various modifications as are suited to the particular use contemplated. Therefore, it is to be understood that the scope of claims is not to be limited to the specific examples of the implementations disclosed and that modifications and other implementations are intended to be included within the scope of the appended claims.

What is claimed is:

1. A method of decoding a syntax element for a current coding unit of video data, the method comprising:
    identifying, for the current coding unit, an above coding unit and a coding tree unit including the current coding unit;
    in accordance with a determination that the above coding unit is within the coding tree unit, decoding, from a video bitstream, a corresponding syntax element for the current coding unit based, at least in part, on a syntax element associated with the above coding unit retrieved from a line buffer associated with the coding tree unit; and
    in accordance with a determination that the above coding unit is not within the coding tree unit, decoding, from the video bitstream, the corresponding syntax element for the current coding unit based, at least in part, on a default value assigned to the syntax element associated with the above coding unit.

2. The method of claim 1, wherein the decoding, from the video bitstream, the corresponding syntax element for the current coding unit based, at least in part, on the syntax element associated with the above coding unit retrieved from the line buffer further comprises:
    updating the corresponding syntax element for the current coding unit in accordance with a width comparison of the above coding unit and the current coding unit and the syntax element associated with the above coding unit retrieved from the line buffer;
    determining a context index of the current coding unit based on the updated corresponding syntax element for the current coding unit; and
    decoding, from the video bitstream, the corresponding syntax element for the current coding unit in accordance with the context index of the current coding unit.

3. The method of claim 1, wherein the decoding, from the video bitstream, the corresponding syntax element for the current coding unit based, at least in part, on a default value assigned to the syntax element associated with the above coding unit further comprises:
    updating the corresponding syntax element for the current coding unit in accordance with a height comparison of a left coding unit of the current coding unit and the current coding unit and the default value assigned to the syntax element associated with the above coding unit;
    determining a context index of the current coding unit based on the updated corresponding syntax element for the current coding unit; and
    decoding, from the video bitstream, the corresponding syntax element for the current coding unit in accordance with the context index of the current coding unit.

4. The method of claim 1, wherein the syntax element is a binary flag.

5. The method of claim 4, wherein the syntax element indicates that the current coding unit is encoded in an intra prediction mode, an intra block copy mode, a matrix-based intra prediction mode, or an affine mode.

6. The method of claim 1, wherein the line buffer is associated with the coding tree unit.

7. A method of encoding a syntax element for a current coding unit of video data, the method comprising:
   identifying, for the current coding unit, an above coding unit and a coding tree unit including the current coding unit;
   in accordance with a determination that the above coding unit is within the coding tree unit, encoding, into a video bitstream, a corresponding syntax element for the current coding unit based, at least in part, on a syntax element associated with the above coding unit retrieved from a line buffer associated with the coding tree unit; and
   in accordance with a determination that the above coding unit is not within the coding tree unit, encoding, into the video bitstream, the corresponding syntax element for the current coding unit based, at least in part, on a default value assigned to the syntax element associated with the above coding unit.

8. The method of claim 7, wherein the encoding, into the video bitstream, the corresponding syntax element for the current coding unit based, at least in part, on the syntax element associated with the above coding unit retrieved from the line buffer further comprises:
   updating the corresponding syntax element for the current coding unit in accordance with a width comparison of the above coding unit and the current coding unit and the syntax element associated with the above coding unit retrieved from the line buffer;
   determining a context index of the current coding unit based on the updated corresponding syntax element for the current coding unit; and
   encoding, into the video bitstream, the corresponding syntax element for the current coding unit in accordance with the context index of the current coding unit.

9. The method of claim 7, wherein the encoding, into the video bitstream, the corresponding syntax element for the current coding unit based, at least in part, on a default value assigned to the syntax element associated with the above coding unit further comprises:
   updating the corresponding syntax element for the current coding unit in accordance with a height comparison of a left coding unit of the current coding unit and the current coding unit and the default value assigned to the syntax element associated with the above coding unit;
   determining a context index of the current coding unit based on the updated corresponding syntax element for the current coding unit; and
   encoding, into the video bitstream, the corresponding syntax element for the current coding unit in accordance with the context index of the current coding unit.

10. The method of claim 7, wherein the syntax element is a binary flag.

11. The method of claim 10, wherein the syntax element indicates that the current coding unit is encoded in an intra prediction mode, an intra block copy mode, a matrix-based intra prediction mode, or an affine mode.

12. The method of claim 7, wherein the line buffer is associated with the coding tree unit.

13. An electronic apparatus comprising:
   one or more processing units;
   memory coupled to the one or more processing units; and
   a plurality of programs stored in the memory that, when executed by the one or more processing units, cause the electronic apparatus to:
   identify, for a current coding unit of video data, an above coding unit and a coding tree unit including the current coding unit;
   in accordance with a determination that the above coding unit is within the coding tree unit, decode, from a video bitstream, a corresponding syntax element for the current coding unit based, at least in part, on a syntax element associated with the above coding unit retrieved from a line buffer associated with the coding tree unit; and
   in accordance with a determination that the above coding unit is not within the coding tree unit, decode, from the video bitstream, the corresponding syntax element for the current coding unit based, at least in part, on a default value assigned to the syntax element associated with the above coding unit.

14. The electronic apparatus of claim 13, wherein the decode, from the video bitstream, the corresponding syntax element for the current coding unit based, at least in part, on the syntax element associated with the above coding unit retrieved from the line buffer further comprises:
   updating the corresponding syntax element for the current coding unit in accordance with a width comparison of the above coding unit and the current coding unit and the syntax element associated with the above coding unit retrieved from the line buffer;
   determining a context index of the current coding unit based on the updated corresponding syntax element for the current coding unit; and
   decoding, from the video bitstream, the corresponding syntax element for the current coding unit in accordance with the context index of the current coding unit.

15. The electronic apparatus of claim 13, wherein the decode, from the video bitstream, the corresponding syntax element for the current coding unit based, at least in part, on a default value assigned to the syntax element associated with the above coding unit further comprises:
   updating the corresponding syntax element for the current coding unit in accordance with a height comparison of a left coding unit of the current coding unit and the current coding unit and the default value assigned to the syntax element associated with the above coding unit;
   determining a context index of the current coding unit based on the updated corresponding syntax element for the current coding unit; and
   decoding, from the video bitstream, the corresponding syntax element for the current coding unit in accordance with the context index of the current coding unit.

16. The electronic apparatus of claim 13, wherein the syntax element is a binary flag.

17. The electronic apparatus of claim 16, wherein the syntax element indicates that the current coding unit is encoded in an intra prediction mode, an intra block copy mode, a matrix-based intra prediction mode, or an affine mode.

18. The electronic apparatus of claim 13, wherein the line buffer is associated with the coding tree unit.

* * * * *